March 1, 1938.  S. E. RICHESON  2,109,597
COFFEE ROASTING MACHINE
Filed Aug. 8, 1936  8 Sheets-Sheet 4

SANFORD E. RICHESON Inventor
BY John P. Nikonow
ATTORNEY

March 1, 1938.　　　　S. E. RICHESON　　　　2,109,597
COFFEE ROASTING MACHINE
Filed Aug. 8, 1936　　　　8 Sheets-Sheet 5

Inventor:
SANFORD E. RICHESON
BY John P. Nikonow
ATTORNEY

March 1, 1938.　　　　S. E. RICHESON　　　　2,109,597
COFFEE ROASTING MACHINE
Filed Aug. 8, 1936　　　　8 Sheets-Sheet 6

SANFORD E. RICHESON   Inventor.
BY  John P. Nikonow
ATTORNEY

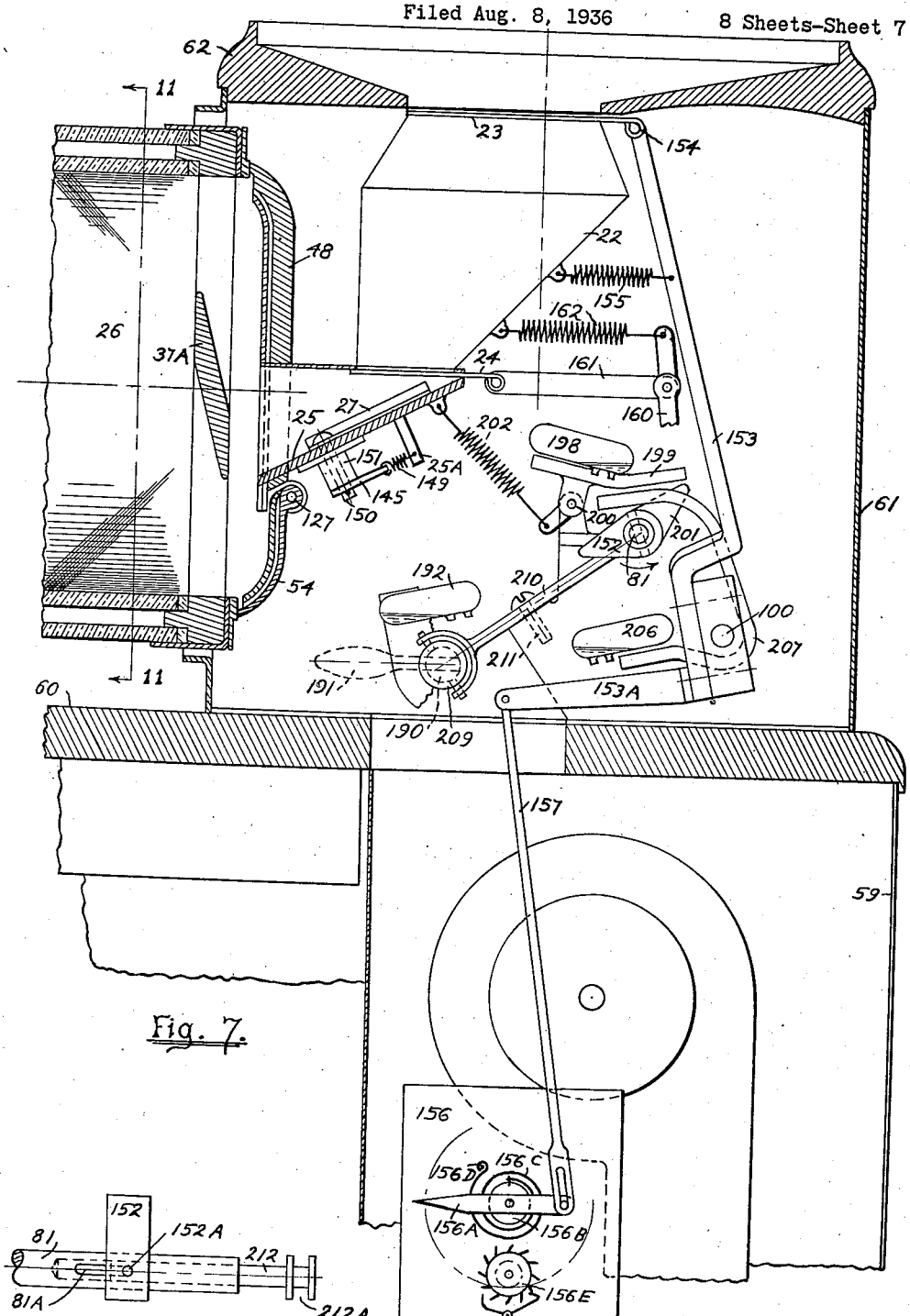

March 1, 1938.  S. E. RICHESON  2,109,597
COFFEE ROASTING MACHINE
Filed Aug. 8, 1936   8 Sheets-Sheet 8

SANFORD E. RICHESON
Inventor
BY John P. Nixon
ATTORNEY

Patented Mar. 1, 1938

2,109,597

UNITED STATES PATENT OFFICE 2,109,597

COFFEE ROASTING MACHINE

Sanford E. Richeson, New York, N. Y., assignor to Richeson Company, Inc., New York, N. Y., a corporation of New York Application August 8, 1936, Serial No. 94,914

11 Claims. (Cl. 34—5)

My invention relates to coffee roasting machines and has particular reference to machines for roasting coffee beans, corn, nuts and similar products, and more particularly, to machines employing electric heaters.

It is a common practice among the large firms to roast coffee in large roasters and in large quantities, and to distribute it to dealers who, in turn, sell it to their customers. It is well known, however, that the roasted coffee deteriorates with age. Consequently, many coffee concerns seal their coffee in cans and some of them mark on each can the date of roasting and sealing. This in an effort to insure the consumer a fresh product.

The object of my invention is therefore to provide a small and compact coffee roasting machine which can be used by ordinary grocery stores for roasting coffee in small quantities as may be required by their customers.

Another object of my invention is to provide a machine which not only roasts the coffee, but also cleans it from chaff and humidifies the product, being entirely automatic and operated by electric current, so that it can be used for roasting coffee by busy clerks in stores with scarcely more skill or attention than is now required to grind it.

Another object of my invention is to provide means to automatically maintain the required roasting temperature in the roasting chamber and to automatically charge the roasting chamber with a measured quantity of a green coffee when the temperature reaches the desired limit. For this purpose I use an electric heater with a thermostatic control and an automatic feeding device, controlled by the thermostat.

Another object of my invention is to provide means in the coffee roasting machine for cleaning the roasted product by brushing it over a perforated plate so that dirt, chaff and small particles of coffee may fall through the perforations and away from the product; and simultaneously to blow air through the coffee and thereby carry away the fine dirt and chaff; and to humidify the coffee by moisture carried in the air current.

Another object of my invention is to provide means for automatically dropping the coffee from the roasting chamber after expiration of a predetermined time, onto the perforated plate; and, after a predetermined time of brushing and cleaning on the plate, to drop it into a bottom hopper, from which it can be scooped out as the finished roasted, cleaned and humidified product.

Another object of my invention is to provide means for preventing the feeding device from delivering new portions of the green coffee into the roasting chamber when the electric switch is turned off, but permitting the operations of roasting and cleaning of the product to be continued to their completion before the machine finally stops.

Another object of my invention is to provide a roasting chamber for coffee, made of a heat resisting glass so as to render the green coffee and the roasting operation to be visible from the outside; also to have the heating unit enclosed or partly enclosed in a container made of a heat resisting glass of high silica content, and to provide a magnifying glass for a window in a compartment where the roasted product is delivered so as to expose it to view.

The use of refractory glass for the roasting chamber has certain advantages, as it permits the roasting operation to be observed, it does not rust or scale and is therefore clean and sanitary, it has a low coefficient of friction so that the coffee can readily flow over its surface. Being a poor heat conductor, the glass holds the heat within the roaster where it is needed and does not heat the store. This effect may be further enhanced by providing the roasting chamber with double glass walls with a space between them and evacuating air from this space. Such double walls can be also used for the heater enclosure.

My invention is more fully described in the accompanying specification and drawings in which—

Figure 1:
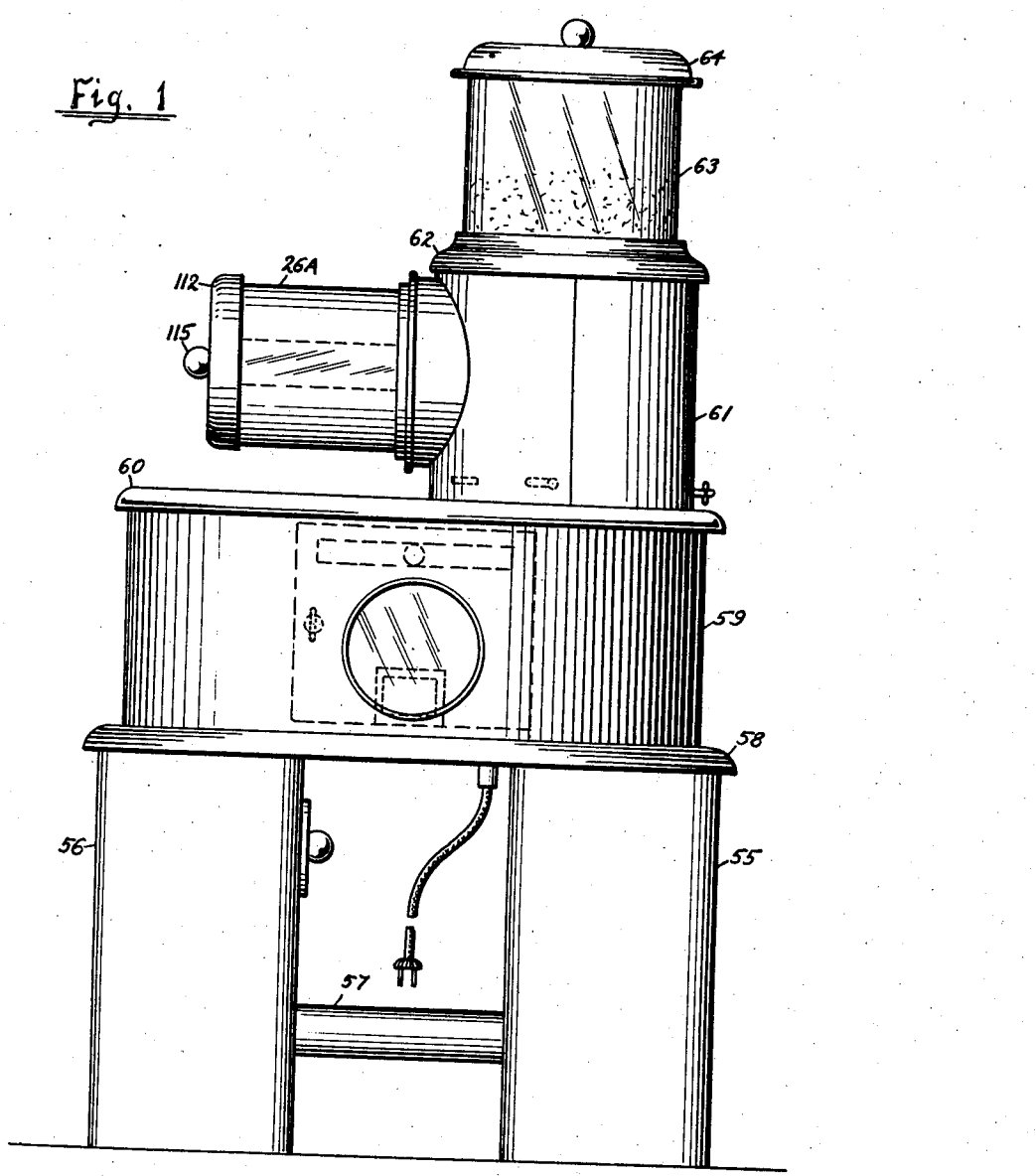
Fig. 1 is a front view of the assembled machine.
Figure 2:
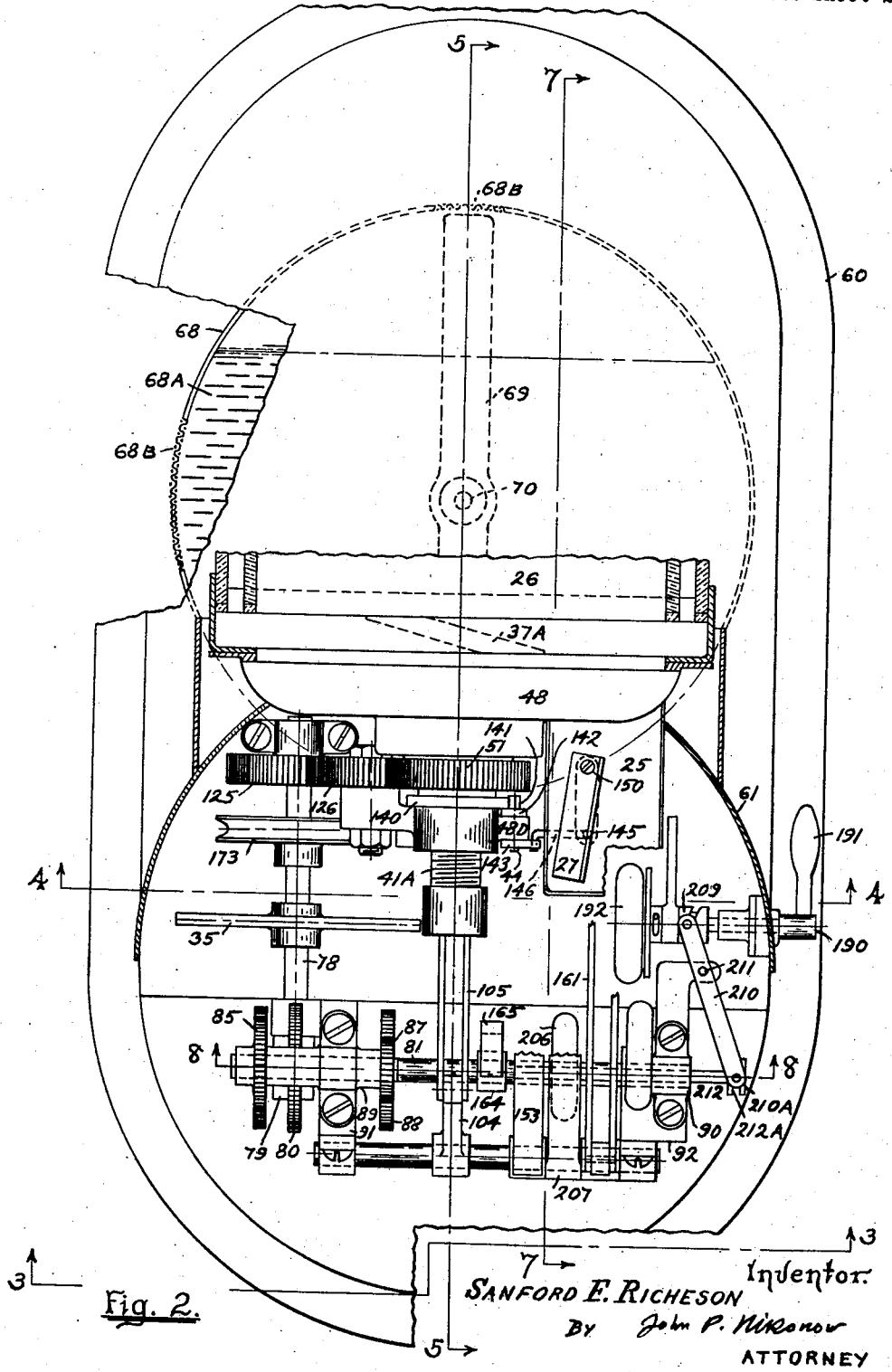
Fig. 2 is a sectional plan view taken on the line 2—2 of Fig. 3.
Figure 3:
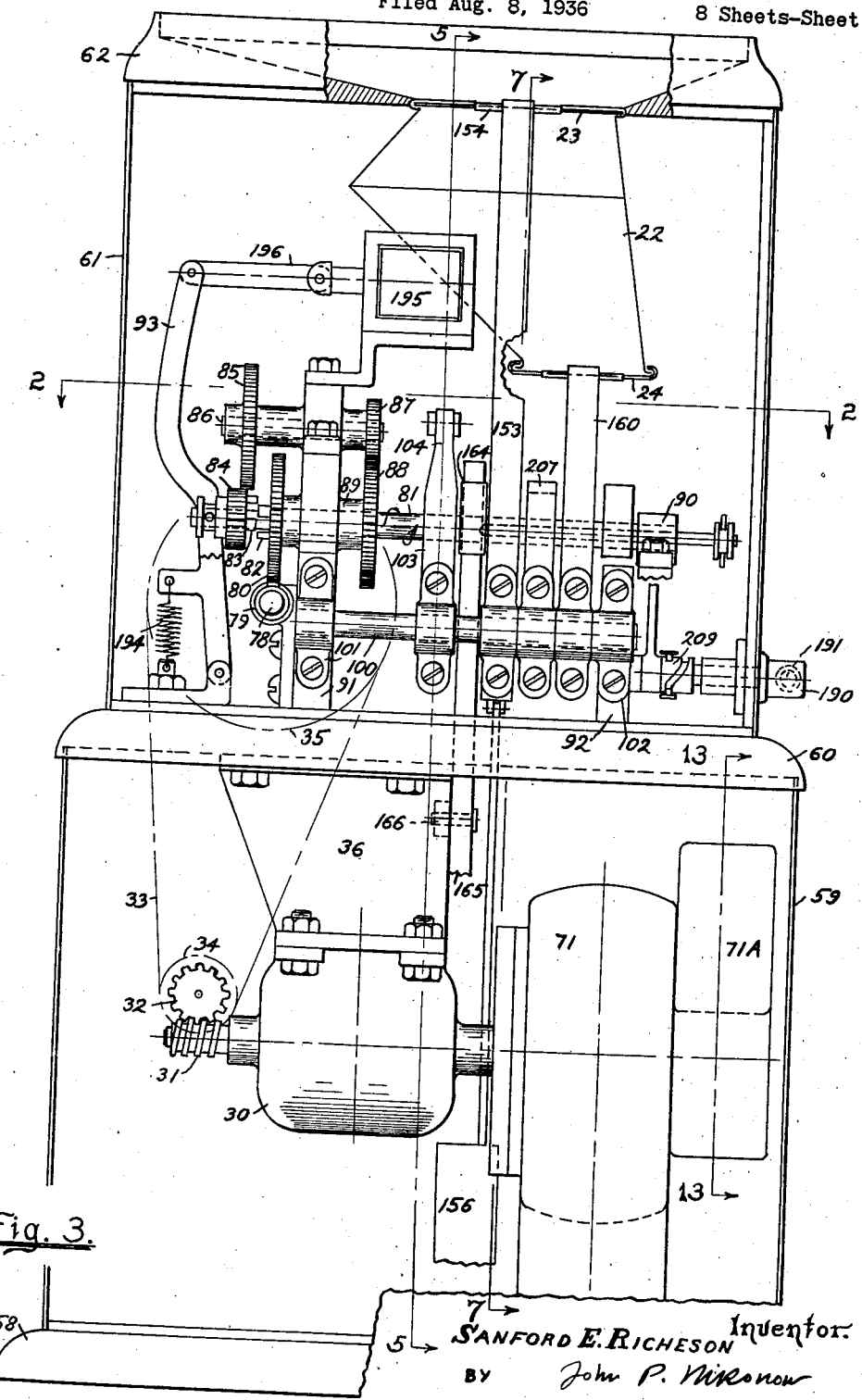
Fig. 3 is an end elevation with the cover removed on the line 3—3 of Fig. 2.
Figure 4:
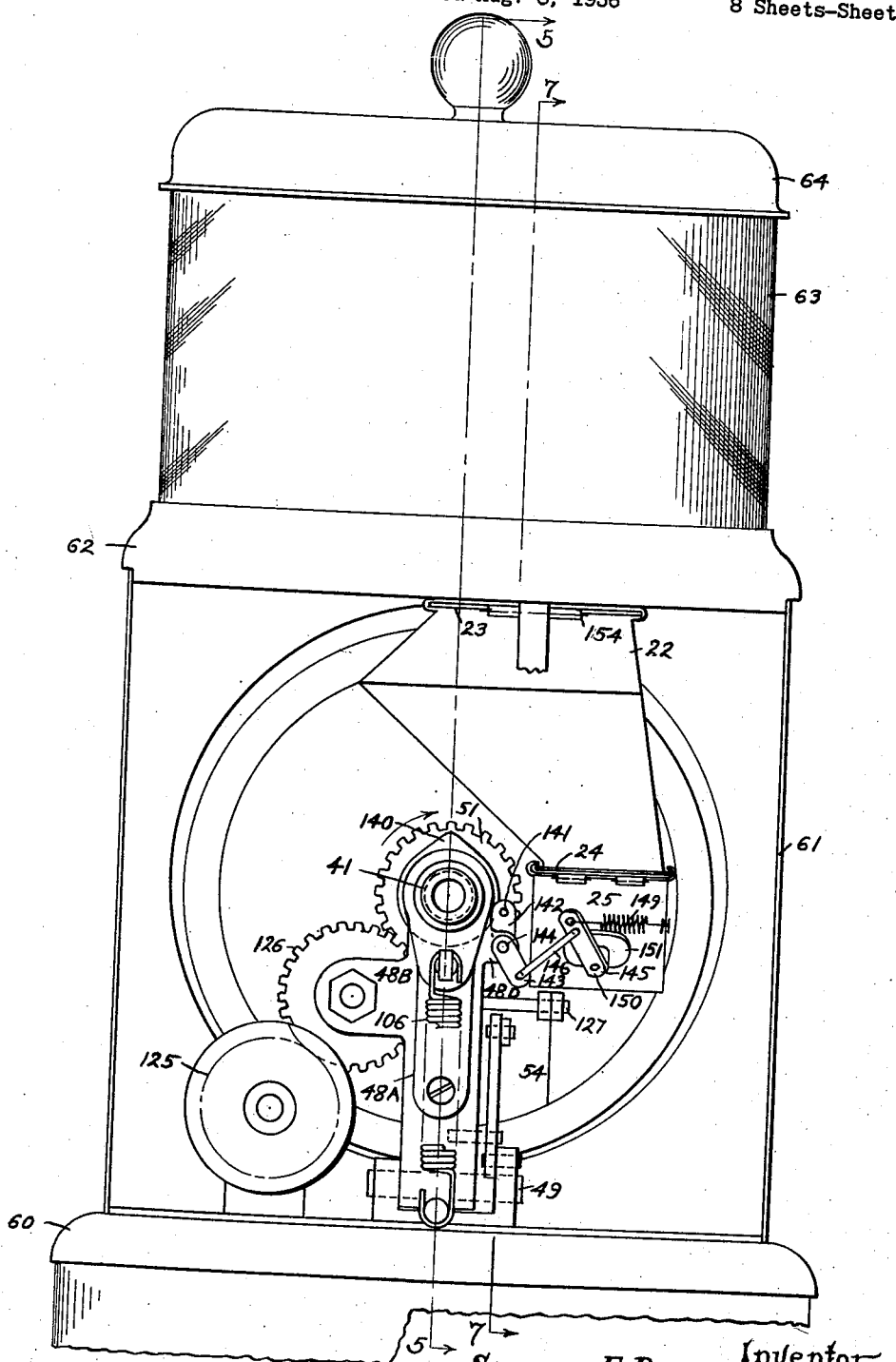
Fig. 4 is a vertical section taken on the line 4—4 of Figs. 2 and 5.
Figure 5:
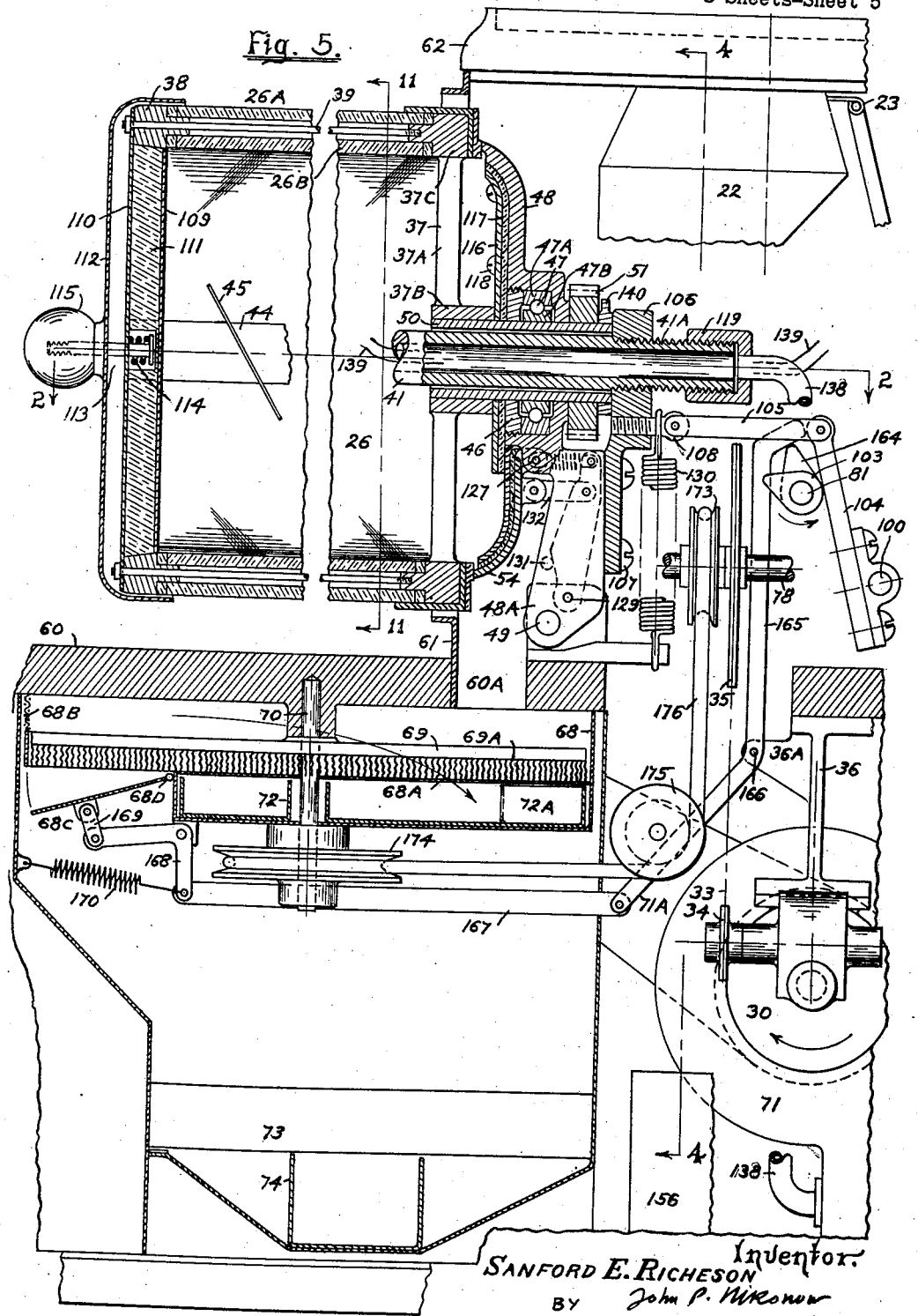
Fig. 5 is a vertical section taken on the line 5—5 of Figs. 2, 3 and 4.
Figure 6:
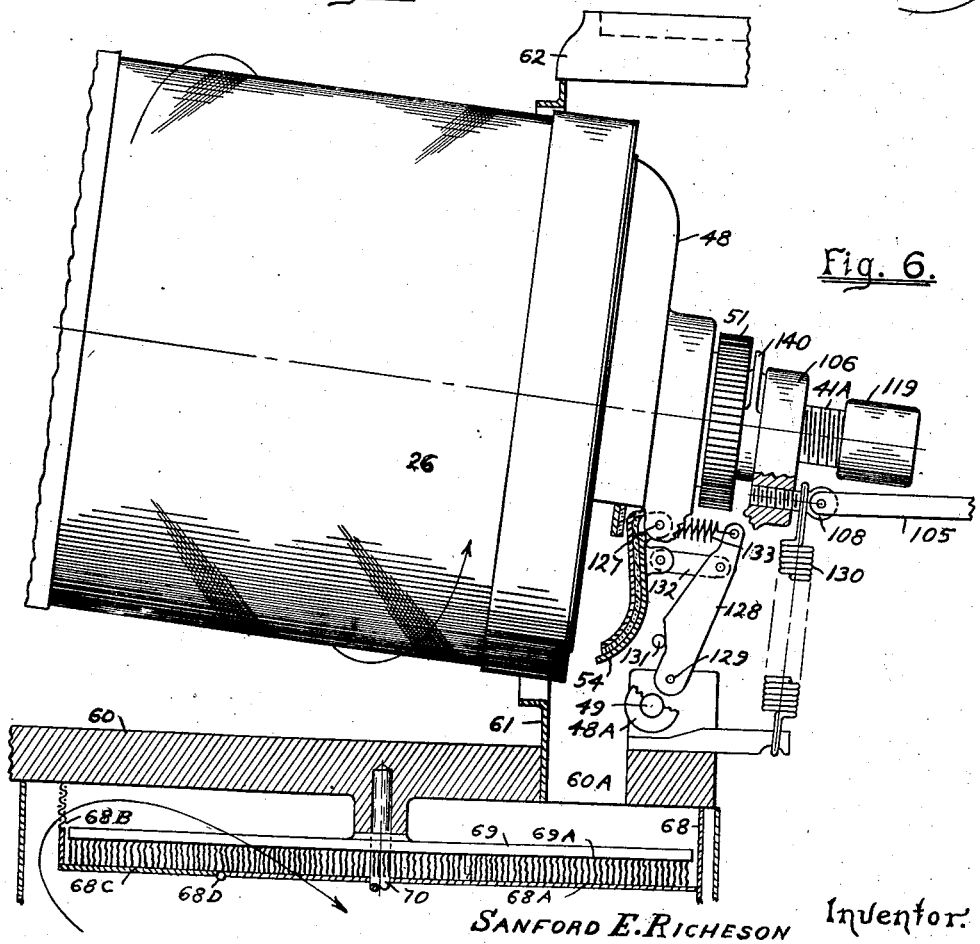

Fig. 6 is a vertical section similar to Fig. 5 as taken on the line 5—5 of Figs. 2, 3 and 4, but with the roasting chamber tilted to discharge the coffee, and with the frame casting 48 broken away to show the parts beyond.

Fig. 7 is a vertical section taken on the line 7—7 of Figs. 2, 3 and 4.

Fig. 8 is a detail view taken on the line 8—8 of Fig. 2.

Figure 9:
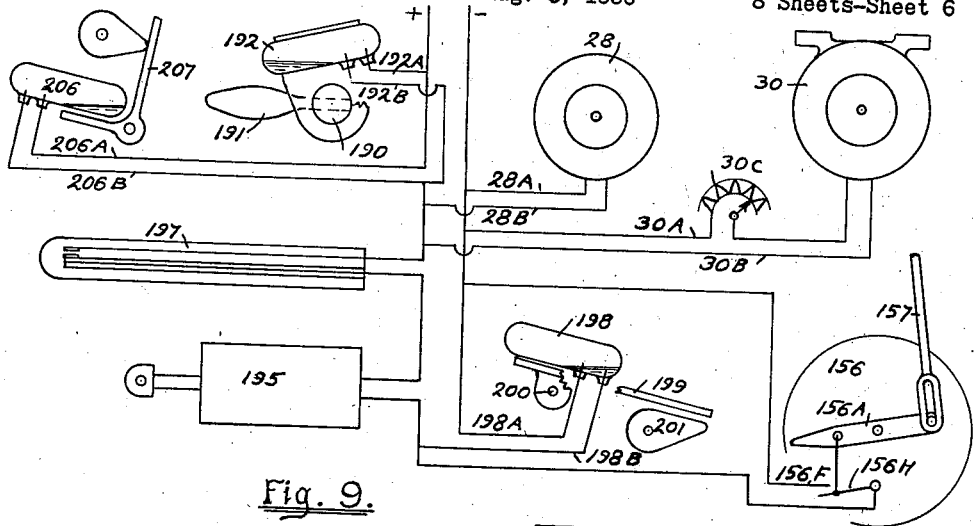

Fig. 9 is a wiring diagram.

Figures 10, 11:
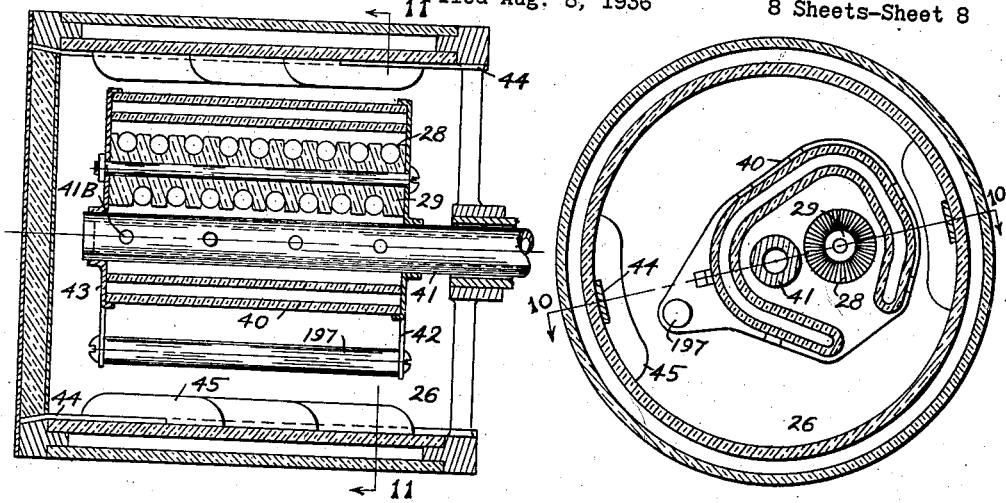

Fig. 10 is a sectional view taken on the line 10—10 of Fig. 11.

Fig. 11 is a vertical sectional view taken on the line 11—11 of Figs. 5, 7 and 10.

Figure 12:
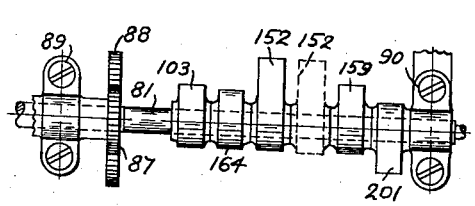

Fig. 12 is a plan view of the cam shaft and cams.

Figure 13:
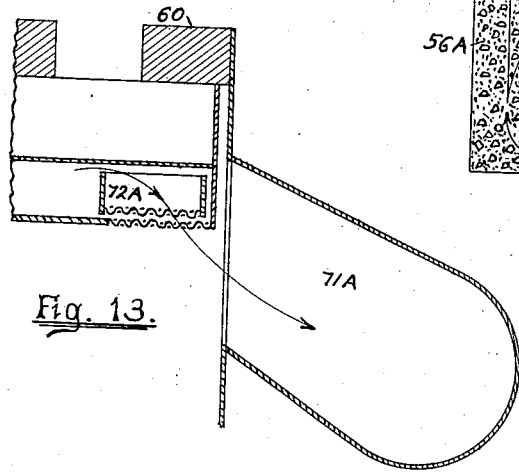

Fig. 13 is a vertical sectional view of the lower part of the machine taken on the line 5—5 of Figs. 2, 3 and 4, showing air currents, the humidifier and filters.

The identical parts are indicated by the same numerals in the drawings, and different ends or portions of the elements are indicated by the numerals with added characters.

Figure 14:
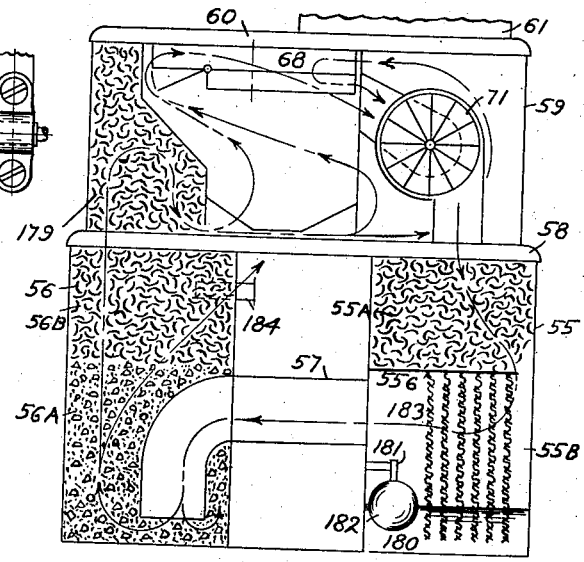

The machine comprises two vertical lower chambers 55 and 56 resting on the floor, with a pipe 57 connecting them as shown in Fig. 14. This carries a vertical wall 59 enclosing a chamber, and wall 59 supports an intermediate plate casting 60, this part of the machine being elliptical in form as shown in Fig. 2. On one end of the plate 60, the right as shown in the drawings, is a vertical cylindrical wall 61 enclosing a chamber circular in plan, and the wall 61 carries a top plate casting 62. Plate 62 carries a cylindrical receiving hopper 63, made of a refractory glass, such as Pyrex, with a removable cover 64. Projecting from the chamber 61 over the left portion of the plate 60, is a cylindrical horizontal glass roasting chamber 26, as shown in Figs. 1, 2, 5, 6, 7, 10 and 11, and as will be further hereinafter explained. The machine is driven by an electric motor 30 through a worm 31, worm gear 32, chain 33 and sprockets 34 and 35.

The principal steps in the roasting operation are as follows: the receiving hopper receives the green or raw coffee. From there it falls into a measuring hopper 22, admitted thereto by a sliding door 23. The door 23 then closes and the sliding door 24 opens, discharging a hopperful of coffee into the chute 25, as shown in Figs. 7, 2 and 4. From the chute 25 it slides between three arms 37A into the rotating cylindrical roasting chamber 26. In the chute 25 it is agitated and aided in its sliding movement by an oscillating arm 27 pivoted at the bottom of the chute. The arms 37A are inclined in a propeller fashion so that by their rotation they push the coffee to the left in Fig. 7 into the cylinder 26.

The roasting chamber or container 26 has a double wall made of a refractory transparent material such as high silica glass like Pyrex, and the space between the walls may be evacuated. It is heated by an electric heating coil 28 wound spirally on a porcelain core 29. This is partly surrounded by a glass case 40, the latter also having double walls with vacuum between them. They are mounted on a stationary pipe 41 by flanges 42 and 43.

Longitudinally of the cylindrical roasting chamber 26 and on the walls thereof, are two bars 44, shown in Figs. 5, 10 and 11, and these carry vanes or agitators 45 inclined as in Fig. 5. As the cylinder and the vanes rotate arrow-wise, with the heater 40 stationary, the vanes stir the coffee and carry it from the entrance at the right, shown in Fig. 7, toward the opposite end of the cylinder. The heater casing 40 is mounted out of the path of the moving material so as to prevent the coffee to be roasted by direct contact with the cover of the heater.

The roasting chamber 26 is held by a ball bearing 47 in a frame casting 48 as shown in Fig. 5 and as will be hereinafter further explained. The casting 48 has a bottom leg 48A which is pivoted on a stationary pin 49. When the coffee has been roasted as above described, the frame casting 48 and the roasting chamber 26 tilt toward the right about the pivot 49, and the door 54 opens, as shown in Fig. 6 and as will also be hereinafter more fully explained. With the roasting cylinder 26 inclined and still rotating, the coffee slides from it through the open door 54, down through an opening 60A in the casting 60, and into the cleaning pan 68. The pan 68 is circular with a perforated bottom 68A, and a portion of its wall 68B is of wire gauze, as shown in plan in Fig. 2 and in the vertical section Figs. 5 and 6. A brush 69 is rigidly mounted on a vertical shaft 70. It has stiff wire bristles projecting from its under side, and they sweep the coffee over the perforated plate 68A. At the same time, a fan 71 pulls air through the gauze section 68B, down through the coffee being swept, down through the perforated plate 68A, into the fan intake 71A and through the fan itself, as shown in Figs. 5, 6, 13 and 14. The dirt and chaff fall through the perforations by gravity and are carried by the air current. The larger heavier particles lodge in the chaff pan 72, Fig. 5, which can be periodically withdrawn and emptied. A small portion 72A of the chaff pan 72 is partitioned off and has a gauze bottom, permitting the passage of the air current as shown in Fig. 13. The finer lighter dust and dirt go through with the air current to the fan.

A door portion 68C of the bottom of the pan 68 is not perforated and is hingedly supported on a part 68D. After a predetermined period of cleaning, the door 68D opens; the brush 69 sweeps the coffee over it, and the roasted and cleaned coffee falls through the open door 68C into a chamber 73, whence it can be scooped out by a scoop 74.

The mechanical moving parts of the machine are operated by an electric motor 30 mounted on an intermediate casting 36, the latter being secured to the plate casting 60. The motor shaft has a worm 31 in mesh with a worm gear 32, the latter being on the same shaft with a sprocket 34 connected by a chain 33 with a sprocket 35 on a shaft 78. The shaft 78 has a worm 79 driving a worm gear 80. The latter turns freely on a cam shaft 81 journaled in bearings 89 and 90 mounted in housings 91 and 92. Rigid with the wheel 80 is one half 82 of a jaw clutch. A gear 84 also turns freely on the cam shaft 81, and rigidly connected with the gear 84 is the other half 83 of the jaw clutch. A lever 93 shifts the gear 84 longitudinally of the cam shaft 81 to engage and disengage the clutch 82—83, as will be hereinafter more fully explained. The gear 84 drives the gear 85 which is rigidly attached to the shaft 86 by a key or other suitable means. At its opposite end, the shaft 86 carries a gear 87 rigidly mounted on it, this gear being in mesh with a gear 88 keyed or otherwise rigidly fitted on the cam shaft 81. Through the gearing described, the worm gear 80 drives the cam shaft 81 when the clutch 82—83 is in engagement, and then only. A fulcrum shaft 100 is held rigidly in bearing members 101 and 102 mounted in housings 91 and 92, and on the shaft 100 there are mounted several levers to be later described.

The frame casting 48 has a leg 48A which is pivoted on a stationary pin 49 as above described and shown in Fig. 5.

A frame member 106 is rigidly attached to the casting 48 by screws 107. A pipe 41 is rigidly fixed in the frame member 106 having a screw thread 41A; and an eye-bolt 108 is screwed into the frame member 106 or otherwise fixed rigidly thereto.

A cam 103 on the cam shaft 81 actuates the lever 104 which is pivoted on the fulcrum shaft 100, and the lever 104 is flexibly connected to the eyebolt 108 as by a link 105. As the shaft 81 and cam 103 rotate in the direction of the arrow then, acting through the members just described, they tilt the frame casting 48 and pull it from its position in Fig. 5 to its position in Fig. 6. A heater 28—29—40 is rigidly attached to the pipe 41, as set forth hereinbefore and shown in Figs. 10 and 11. And as the pipe 41 is held rigidly to the frame casting 48, the heater does not rotate.

A cap 119 is screwed over the end of the pipe 41. The opposite end of the pipe 41 is plugged. A flexible air hose 138 runs from the outlet of the fan 71 through the cap 119. The air current from the fan is driven thence through the pipe 41 and out through holes 41B to the heating coil 29 within the glass case 40, as shown in Figs. 5, 10 and 11. There it is heated and is then admitted out into the roasting chamber 26 to deliver its heat to the coffee. Electric wires 139 also pass through the cap 119 and through the pipe 41 to the heating coil 28.

As shown in Fig. 5, the outer member 47A of the ball bearing 47 is fixed in the casting 48 and is held rigidly in its place by a plate 46 screwed into the casting 48. The inner member 47B of the ball bearing 47 is fitted rigidly on the hollow shaft 50, the latter being thereby rotatably supported on the ball bearing 47. A gear 51 on the shaft 50 serves to rotate the latter, as will be hereinafter described.

Rigidly attached to the hollow shaft 50 is a spider 37, comprising a hub 37B and a rim 37C. The outer and inner glass cylinders 26A and 26B of the roasting chamber 26 are fitted and cemented to the rim 37C. The two cylinders are fitted and cemented to the rim 38. The metal rims and glass cylinders are held securely together by bolts 39. The cylinders form an airtight space between them which may be evacuated. The end of the roasting chamber 26 is sealed by metal plates 109 and 110 with an insulating packing 111 of asbestos or other suitable material between them. A plate 112 covers the end of the chamber and is held in place by a bolt 113 which may slide non-rotatably in the plate 110, compressing the spring 114 as a ball 115 is screwed on its end. The arms 37A of the spider are spaced apart to let the coffee slide between them, and are inclined to move the coffee to the left as they rotate, as hereinbefore set forth. A plate 116 is fastened to the frame casting 48 by screws 118 with asbestos or other insulation 117 between them to conserve the heat.

A gear 125 on the worm shaft drives an idle gear 126, the latter driving a gear 51 and thereby driving the hollow shaft 50 and the roasting chamber 26, as shown in Figs. 2 and 4. The idle gear 126 is carried by the arm 48B of the frame casting 48 and tilts with this casting. Thus it is that the roasting chamber 26 rotates, while the heater unit 28—29—40 is non-rotatable. After the cam 103 has tilted the roasting chamber as shown in Fig. 6, the weight of the chamber brings it back to the horizontal position of Fig. 5. A spring 130 overcomes the weight partially and aids the cam and the driving mechanism.

A door 54 is pivoted on a pin 127 fitted in the frame casting 48 as shown in Figs. 4, 5 and 6. Lever 128 is pivoted on a stationary pin 129. A pin 131 is fixed rigidly in the leg 48A of the casting 48, and as the casting 48 tilts, the pin 131 presses the lever 128 to the right as in Fig. 6.

The lever 128 is flexibly connected to the door 54 by a link 132, and as the lever 128 is pressed to the right, it pulls the door 54 open. As the roasting cylinder moves back to horizontal position, a spring 133 pulls the door shut.

A cam 140 is rigidly mounted on the rotating hollow shaft 50, as shown in Fig. 5. It engages a pin 141 on a lever 142. As shown in Figs. 2 and 4, the levers 142 and 143 are rigidly mounted on a small shaft 144, which oscillates in a bearing in the arm 48D of the frame casting 48, as the cam 140 rotates. The lever 143 is flexibly connected to a lever 145 by a link 146, and the lever 145 is connected to an arm 25A of a chute 25 by a spring 149. The lever 145 and the arm 27 are rigidly mounted on a small shaft 150, which oscillates in a bearing 151 on the bottom of the chute 25, as shown in Figs. 2, 4 and 7. Through these means, the cam 140, as it rotates, oscillates the arm 27 in the chute 25, agitating the coffee therein, and aids it to slide down the chute into the roasting chamber, as hereinbefore described.

A cam 152 on the cam shaft 81 actuates a lever 153 which is pivoted on the fulcrum shaft 100. The lever 153 is flexibly connected to the sliding door 23 by a hinge 154. Through these means, the cam 152, as it rotates, pulls open the sliding door 23 and admits the green coffee from the receiving hopper 63 into the measuring hopper 22 as mentioned hereinbefore.

A clock 156 is mounted on the plate casting 58. An arm 153A is rigidly connected to the lever 153 and is flexibly connected to a hand 156A by a link 157. The hand 156A is rigidly connected with a drum 156B, the latter being connected with one end of a spring 156C. The other end of this spring is connected to a stationary pin 156D. Thus as the cam 152 pushes the lever 153 back to the right to open the sliding door 23, it simultaneously turns the hand 156A and the drum 156B and winds the spring 156C. The lever 153 moves quickly back and closes the door 23, but the hand 156A is connected to an escapement 156E and runs for a predetermined interval, for instance, 7 minutes. The purpose of the clock will be explained later in connection with the wiring diagram.

A cam 159 on the cam shaft 81 actuates a lever 160 which is pivoted on the fulcrum shaft 100. The lever 160 is flexibly connected to a sliding door 24 by a link 161. Through these means, the cam 159, as it rotates, pulls open the sliding door 24 after the sliding door 23 has closed, and discharges a hopperful of coffee from the measuring hopper 22 onto the chute 25. A spring 162 pulls the door 24 shut.

A cam 164 actuates a lever 165 which is pivoted on a pin 166 in an arm 36A of the supporting casting 36, as shown in Figs. 5 and 3. The lever 165 is flexibly connected to a door 68C in the bottom of the cleaning pan 68 through a link 167, bell crank lever 168 and link 169. Through these means, the cam 164, as it rotates, pulls open the door 68C and discharges the coffee, roasted and cleaned, from the cleaning pan 68 into the chamber 73. Spring 170 then pulls the door 68C shut.

A pulley 173 is rigidly mounted on the worm shaft 78 and is connected by a belt and idle pulleys 175 with a pulley 174 on a shaft 70. The shaft 70 drives the brush 69 for cleaning the coffee.

The bottom parts of the machine are shown in Fig. 14. Underneath the fan there is a chamber 55A filled with steel wool or other filter. Beneath the chamber 55A is a chamber 55B, with a horizontal partition 55C dividing the two chambers.

The chamber 55B holds a reservoir of water 180 in its bottom, with a valve 181 and float 182 to supply water and regulate its depth. Cloth curtains 183 are supported from the partition 55C and dip into the water. The lower portion of the chamber 56 and around the end of the pipe 57 is filled with charcoal or similar filtering and purifying substance 56A. The upper portion of this chamber is filled with steel wool or similar filtering material 56B. A chamber 179 above the plate 58 is filled with steel wool also.

The fan 71 is direct connected to the motor 30 as shown in Fig. 3. It discharges downward through the steel wool in the chamber 55A, and thence through the cloth curtains 183. The water from the reservoir below saturates these curtains through capillary attraction. The air passes thence through the pipe 57, through the charcoal 56A and again through the steel wool in the chambers 56B and 179. The steel wool and the cloth filter out the fine dirt brought in the air current from the cleaning pan 68, and the water in the cloth humidifies the air. A drawer 184, open at the top and bottom, serves as a vent. A small part of the air passes out thence, while the bulk of it, cleaned and moistened, returns to the pan 68 to clean more coffee, as shown in Figs. 14, 5, 6 and 13.

A solenoid 195 is flexibly connected to a lever 93 by a link 196. With the solenoid not energized, a spring 194 holds the lever 93 and the gear 84 to the left and the clutch 82—83 disengaged, as shown in Fig. 3. In this position, the motor 30 runs without turning the cam shaft or the cams thereon. When the solenoid 195 is energized, it pulls the lever 93 and the gear 84 to the right, engaging the clutch 82—83 and turning the shaft 81.

A bimetallic thermostatic element 197 is supported within the roasting chamber 26 as shown in Figs. 10 and 11. It closes an electrical contact at a predetermined temperature, for instance, 202° C. This conducts the electric current to the solenoid 195, energizing it, thereby engaging the clutch 82—83. A switch is provided for connecting the machine with a supply circuit. A switch shaft 190 carries a mercury switch 192, the shaft having a handle 191 for its manual operation. The handle in the drawings is shown horizontal, in which position the mercury is away from the wires and the switch is open. To start the machine, the operator fills the receiving hopper 63 with green coffee and turns the handle 191 into the vertical position. The mercury flows then to the right hand end of the tube 192, covering the wires 192A and 192B and thereby closing the switch to conduct the electric current to the machine, as shown in Fig. 9. The current flows to the heating coil 28 through wires 28A and 28B, and heats the roasting chamber. The motor 30 receives the current through wires 30A, 30B and rheostat 30C, starting to rotate. The motor, through the worm 31 and gear 32, sprockets 34 and 35, chain 33, shaft 78, gears 125, 126 and 51, and hollow shaft 50, rotates the roasting chamber 26.

The shaft 78, through the pulleys 173, 174, 175, and belt 176, rotates the brush 169 over the perforated plate 68A. However, until the thermostat 197 is heated to its predetermined temperature, the current cannot flow past it to energize the solenoid 195 or to open the sliding door 23 and admit coffee. Therefore, no coffee passes down the receiving hopper 63 until the thermostat, and consequently the roasting chamber 26, reach their proper roasting temperature, such as 202° C. When, however, the required temperature is reached, the thermostat 197 makes the electrical contact, solenoid 195 is energized, the shaft 81 rotates and the sliding doors 23 and 24 open and close, thereby admitting a hopperful of coffee to the roasting chamber 26.

It is necessary that the coffee shall remain in the roasting chamber through a predetermined interval, and this is accomplished as follows. A mercury switch 198 is mounted on a lever 199, pivoted on a stationary pin 200, actuated by a cam 201 on the cam shaft 81, as shown in Figs. 7 and 9. A spring 202 closes the switch; the cam opens it. The electric current can flow through wires 198A and 198B, through the switch 198 and thus complete the circuit through the solenoid 195. Current can also flow through wires 156F and 156H of the clock 156 and thus complete the circuit through the solenoid 195. If either the clock switch 156 or the mercury switch 198 is closed, the solenoid can be energized. Now when the lever 153 moves to the right and opens the door 23, it winds the clock 156 and also opens the clock switch 156, as shown in Figs. 7 and 9. But current continues to flow through the mercury switch 198 and the solenoid 195 remains energized until the cam 201 opens that switch. Then the solenoid 195 is deenergized and the spring 194 disengages the clutch 82—83 (Fig. 3), and the cam shaft stops.

When the operator turns the handle 191 to the horizontal position in order to shut off the current and stop the machine, it is necessary that it does not stop at once, but that it finishes roasting and cleaning the coffee already within it. This is accomplished as follows:

A mercury switch 206 is carried and actuated by a lever 207 carried on the fulcrum shaft 100, and a lever 207 is adjacent to the lever 153, as shown in Figs. 7, 2 and 3. In the normal operation of the machine, the cam 152 engages and actuates the lever 153 and sliding door 23 to admit green coffee. Referring to the wiring diagram Fig. 9, if the hand switch 192 is closed, electric current may flow through it and through the wires 192A and 192B from an outside source to the heater 28, motor 30 and other parts of the machine as described. Now if the automatic switch 206 is closed, current may also flow through it and through the wires 206A and 206B from the same outside source to the heater, motor and other parts of the machine. Thus if either hand switch 192 or the automatic switch 206 is closed, current may flow into the machine and actuate it.

The handle 191 is rigidly fastened on the shaft 190, the latter carrying a cylindrical cam 209, as shown in Figs. 7, 2 and 3. The cylindrical cam 209 actuates a lever 210 which is pivoted on a stationary fulcrum pin 211 on the housing 92. The right hand end of the cam shaft 81 is bored longitudinally. Pins 210A of the lever 210 fit in the groove 212A of the lever 212 and slide said lever 212 to the right or left within the bore of the cam shaft 81. The cam 152 is pinned to the shaft 212 by a pin 152A, and this pin may slide to the right or left in the slot 81A, as shown in Fig. 8.

Thus, when the handle 191 is vertical and the machine is running, the shaft 212 is in its left hand position, shown fully in Fig. 12, and the cam 152 engages the lever 153, opens the sliding door 23 and admits coffee to the machine. When the handle 191 is horizontal, the shaft 212 is pulled out to its right hand position, and the cam 152, shown in dotted lines in Fig. 12, no longer engages the lever 153 but engages the lever 207. The first effect, then, of placing the lever 191 in the horizontal position, is to leave the door 23 shut so that no more coffee can enter the machine. Placing it horizontally also opens the hand switch 192 so that current can no longer flow through it to the motor and other working parts. But so long as automatic switch 206 is closed, current can flow through it, and the machine continues to run. It continues to run until the cam 152 throws the lever 207 and thereby opens the automatic switch 206, and the parts are so arranged that this occurs at the end of the cycle when a given roasting and cleaning operation is completed.

I claim as my invention:

1. A coffee roasting machine comprising a housing, a hollow shaft, means to inclinably support the shaft in the housing, a spider rotatively supported on the shaft, a roasting cylinder supported by one end on the spider, the other end of the cylinder being closed, a hollow rod passing through the shaft into the cylinder and supported by its outer end in the inclinable shaft support, an electric heater in the cylinder supported on the rod, a stationary cover for the spider end of the cylinder, a door in the lower portion of the cover, means to open the door by the inclining movement of the cylinder, a discharging chute under the door, a loading chute in the cover, means to rotate the cylinder, means periodically to deliver charges of a raw material into the cylinder through the loading chute, means to control the length of time of roasting, means to incline the cylinder toward the rear at the expiration of the roasting period thereby opening the door for discharging the roasted product, and means to clean the discharged product.

2. A coffee roasting machine comprising a housing, a hollow rod supported in the housing, a hollow shaft rotatively supported on the rod, a spider supported on the shaft, a roasting cylinder supported by one end on the shaft, means to rotate the shaft with the cylinder, means to deliver a raw material into the cylinder, an electric heater supported on the rod in the cylinder, a casing partly enclosing the rod and the heater, the rod being provided with apertures in the casing, means to deliver air through the rod and through the casing into the cylinder for roasting the material, means to discharge the roasted product from the cylinder, and means to control the length of time between the discharging operations.

3. A coffee roasting machine comprising a housing, a bracket rotatively supported in the housing, a hollow shaft rotatively supported in the bracket, a spider supported on the shaft, a roasting cylinder supported by one end on the spider, a hollow rod passing through the shaft into the cylinder, an electric heater on the rod, means to deliver a raw material into the cylinder, means to rotate the cylinder, means to deliver air into the cylinder through the rod, means to cause the air to flow around the heater before it enters the cylinder for roasting the coffee, and means to incline the bracket with the shaft and the cylinder for discharging the roasted product, said rotating and said air delivering means being adapted to remain operative when the cylinder is in the inclined position.

4. A coffee roasting machine comprising a housing, a roasting cylinder rotatively supported in the housing, means to rotate the cylinder, means to deliver a raw material into the cylinder, an electric heater in the cylinder adapted to heat the air for roasting the material, means to remove the roasted product from the cylinder, a receiving container for the product, a container with a filtering material, a container with an air humidifying and washing material, means to circulate air through the roasted hot product in the receiving container, through the filtering material, and through the cylinder over the heater.

5. A coffee roasting machine comprising a roasting cylinder, a tubular extension on one end of the cylinder, a bracket rotatively supporting the tubular extension, means to rotate the cylinder by its tubular extension, a tubular rod extending into the cylinder through the tubular extension, an electric heater supported on the rod in the cylinder, a casing partly enclosing the rod and the heater, the casing being made of a material transparent to radiation and resistant to heat conduction, means to force air into the casing through the rod, means to deliver a raw material into the cylinder, and means to remove the roasted product from the cylinder.

6. A coffee roasting machine comprising a roasting cylinder, a tubular extension on the cylinder, a bracket rotatively supporting the extension, a frame supporting the bracket, an electric motor supported on the frame, operative connections between the motor and the cylinder extension, the cylinder being adapted to be inclined on the bracket, means operated by the motor for inclining the cylinder, the connections between the motor and cylinder being adapted to remain operative when the cylinder is inclined in relation to the motor, means to deliver a raw material into the cylinder, means to force air into the cylinder, means to heat the air for roasting the material, means to discharge the roasted product when the cylinder is inclined, and means to control the intervals of time between the charging and discharging operations.

7. A coffee roasting machine comprising a roasting cylinder, a tubular extension on the cylinder, a bracket rotatively supporting the cylinder, a frame, the bracket being rotatively supported on the frame and adapted to be inclined with the cylinder, an electric motor supported on the frame and operatively connected with the extension for rotating the cylinder, an electric heater in the cylinder, a casing partly enclosing the heater, means to deliver a raw material into the cylinder, means to blow air into the cylinder through the casing over the heater for roasting the material, a cam shaft rotatively supported on the frame, a clutch connecting the cam shaft with the motor, a magnet controlling the clutch, a thermostatic element in the cylinder adapted to control the magnet, means to operate the material delivering means by the cam shaft, a clock mechanism, means to render the clock operative by the material delivery operating means, a switch on the clock adapted to disconnect the magnet circuit when the clock begins to operate, and being adapted to be closed by the clock at the expiration of a predetermined period of time, and means operated by the cam shaft for inclining the cylinder for discharging the roasted product when the magnet is rendered operative by the clock mechanism.

8. A coffee roasting machine comprising a roasting cylinder, means to rotatively support the cylinder, means to rotate the cylinder, a feeder adapted to deliver a raw material into the cylinder, means to roast the material in the cylinder, means to discharge the roaster product from the cylinder, a cam mechanism adapted to operate the feeder by the cylinder rotating means, a manual means to control the motor and the roasting means, and a cam-operated means to control the motor and roasting means, the manual means being adapted to render the cam-operated means operative until the roasting and discharging operations are completed and when the manual means is placed in the inoperative position.

9. A coffee roasting machine comprising a roasting cylinder, means to rotatively support the cylinder, means to rotate the cylinder, a feeder adapted to deliver a charge of a raw material into the cylinder, an electrical means to roast the material in the cylinder, means to discharge the roasted product from the cylinder, a clock mechanism, means to wind the clock mechanism during charging operation of the feeder, the clock being adapted to run for a predetermined period of time after being wound, means to render the feeder and the discharging means inoperative for a predetermined period of time by the clock, a manually operable switch for the cylinder rotating means and material roasting means, and means to maintain the roasting and rotating means operative until the last roasting and discharging operations are completed when the manual switch is placed in the inoperative position.

10. A coffee roasting machine comprising a roasting cylinder, means to rotatively support the cylinder, a motor adapted to rotate the cylinder, a feeder adapted to deliver a charge of a raw material into the cylinder, an electric heater in the cylinder for roasting the material, means to discharge the roasted product from the cylinder, a manually operable switch for the motor and heater, a supplementary switch for the motor and heater, means to operate the feeder by the motor, and means to transfer the feeder operating means to the supplementary switch by the manual switch being placed in the inoperative position, the supplementary switch being adapted to be disconnected upon completion of the last roasting and discharging operations.

11. A coffee roasting machine comprising a roasting cylinder, means to roast the material in the cylinder, means to discharge the roasted product from the cylinder, a container for the hot discharged roasted product, means to remove the chaff from the product in the container, means to suck air through the product in the container, means to prevent the greater portion of the chaff from being entrained by the air, means to filter and to wash the exhaust air, means to remove smoke and vapors from the exhaust air, and means to return the purified air to the product in the container.

SANFORD E. RICHESON.